(12) United States Patent
Chen

(10) Patent No.: US 11,604,872 B2
(45) Date of Patent: *Mar. 14, 2023

(54) THREAT DETECTION METHOD AND APPARATUS, AND NETWORK SYSTEM

(71) Applicant: HUAWEI TECHNOLOGIES CO., LTD., Guangdong (CN)

(72) Inventor: Jia Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 303 days.

This patent is subject to a terminal disclaimer.

(21) Appl. No.: 17/103,247

(22) Filed: Nov. 24, 2020

(65) Prior Publication Data

US 2021/0081526 A1      Mar. 18, 2021

Related U.S. Application Data

(63) Continuation of application No. 15/866,236, filed on Jan. 9, 2018, now Pat. No. 11,036,849, which is a
(Continued)

(30) Foreign Application Priority Data

May 10, 2016    (CN) .......................... 201610305868.1

(51) Int. Cl.
*G06F 21/53*        (2013.01)
*G06F 21/12*        (2013.01)
(Continued)

(52) U.S. Cl.
CPC ............ *G06F 21/53* (2013.01); *G06F 21/128* (2013.01); *G06F 21/563* (2013.01); *G06F 21/566* (2013.01); *H04L 63/1483* (2013.01)

(58) Field of Classification Search
CPC ...... G06F 21/53; G06F 21/128; G06F 21/563; G06F 21/566; H04L 63/1483
(Continued)

(56) References Cited

U.S. PATENT DOCUMENTS 9,104,864 B2    8/2015  Penton et al.
9,305,165 B2    4/2016  Snow et al.
(Continued)

FOREIGN PATENT DOCUMENTS

CN    101692267 A    4/2010
CN    102088379      6/2011
(Continued)

OTHER PUBLICATIONS

Egele,"A survey on Automated Dynamic Malware-Analysis Techniques and Tools", Feb. 8, 2012, ACM, pp. 1-42 (Year: 2012).*
(Continued)

*Primary Examiner* — Taghi T Arani
*Assistant Examiner* — Gregory A Lane
(74) *Attorney, Agent, or Firm* — Fish & Richardson P.C.

(57) ABSTRACT

Example threat detection methods and apparatus are disclosed. One example method includes obtaining page code of a first display page group identified by a uniform resource locator (URL) and an overall size occupied by the first display page group in a display area of a browser of a Web sandbox when loading the URL in the browser. After preset dynamic code is injected into the page code of the first display page group, the page code is parsed and executed. A request message is sent when a value of a display variable is greater than or equal to a preset value, to request to obtain page code of a second display page group. A response message that carries the page code of the second display
(Continued)

page group is received. It is further detected, in the Web sandbox, whether the page code of the second display page group carries attack code.

20 Claims, 6 Drawing Sheets

Related U.S. Application Data continuation of application No. PCT/CN2017/071149, filed on Jan. 13, 2017.

(51) Int. Cl.
*G06F 21/56* (2013.01)
*H04L 9/40* (2022.01)

(58) Field of Classification Search
USPC .......................................................... 726/23
See application file for complete search history.

(56) References Cited

U.S. PATENT DOCUMENTS

| | | | |
|---|---|---|---|
| 10,049,168 B2 | 8/2018 | Mischook et al. | |
| 2005/0044242 A1 | 2/2005 | Stevens et al. | |
| 2008/0127292 A1 | 5/2008 | Cooper et al. | |
| 2009/0158430 A1 | 6/2009 | Borders | |
| 2011/0078790 A1 | 3/2011 | Fazunenko et al. | |
| 2011/0087648 A1 | 4/2011 | Wang et al. | |
| 2012/0197770 A1 | 8/2012 | Raheja et al. | |
| 2012/0287020 A1* | 11/2012 | Utsuki ................ | H04L 67/10 345/204 |
| 2012/0311702 A1 | 12/2012 | Krstic et al. | |
| 2013/0290404 A1 | 10/2013 | Rajabi et al. | |
| 2014/0137184 A1 | 5/2014 | Russello et al. | |
| 2014/0189498 A1 | 7/2014 | Liverant et al. | |
| 2014/0338000 A1 | 11/2014 | Newman | |
| 2015/0289136 A1 | 10/2015 | Hata et al. | |
| 2016/0070551 A1 | 3/2016 | Miller et al. | |
| 2016/0088015 A1 | 3/2016 | Sivan et al. | |
| 2016/0205125 A1 | 7/2016 | Kim et al. | |
| 2018/0046731 A1* | 2/2018 | Peretz ................... | G06F 16/955 |
| 2021/0170781 A1* | 6/2021 | Liang ..................... | A47B 19/10 |

FOREIGN PATENT DOCUMENTS

| | | |
|---|---|---|
| CN | 103582888 | 2/2014 |
| CN | 104137079 A | 11/2014 |
| CN | 104967628 A | 10/2015 |
| JP | 2012078877 A | 4/2012 |
| JP | 2014534498 A | 12/2014 |
| JP | 2015201768 A | 11/2015 |

OTHER PUBLICATIONS

Chinese Office Action issued in Chinese Application No. 201610305868.1 dated Apr. 12, 2019, 10 pages.
Egele, "A Survey on Automatic Dynamic Malware-Analysis Techniques and Tools,," Feb. 8, 2012, ACM, pp. 1-42 year: 2012.
Notice of allowance issued in Japanese Application No. 2018-540440 dated Aug. 27, 2019, 3 pages.
Office Action issued in Indian Application No. 201 837025887 dated Apr. 8, 2021, 5 pages.
Peng Su, "Principle of Cross-site Scripting Attacks," Electronic Science and Technology, vol. 01, No. 01, Jul. 2014, total 7 pages.
Office Action issued in Indian Application No. 201873026887 dated Apr. 8, 2021, 5 pages.
Alexander Moshchuk, et al, "SpyProxy: Execution-based Detection of Malicious Web Content," USENIX, ☐ Aug. 15, 2007, 16 pages, XP061011093.
Https://web.archive.org, "How to scroll down with Phantomjs to load dynamic content," https://stackoverflow.com/questions/16561582/how-to-scroll-down-with-phantomjs-to-load-dynamic-content, Aug. 22, 2014, 4 pages, XP055482444.
Uran Englender, et al., JavaScript Hooking as a Malicious Website Research Tool, https//blog.checkpoint.com/2015/08/i8/javascript-hooking-malicious-website-research-tool/, Aug. 18, 2015, 6 pages, XP055482282.

* cited by examiner

THREAT DETECTION METHOD AND APPARATUS, AND NETWORK SYSTEM

CROSS-REFERENCE TO RELATED APPLICATIONS

This application is a continuation of U.S. patent Ser. No. 15/866,236, filed on Jan. 9, 2018, which is a continuation of International Application No. PCT/CN2017/071149, filed on Jan. 13, 2017, which claims priority to Chinese Patent Application No. 201610305868.1, filed on May 10, 2016. All of the aforementioned patent applications are hereby incorporated by reference in their entireties.

TECHNICAL FIELD

This application relates to the field of computer technologies, and in particular, to a threat detection method and apparatus, and a network system.

BACKGROUND

With development and popularity of computer network technologies, more users start to focus on network security issues, and network attacks implemented by using a network (Web) application appear frequently. For example, to achieve an attack purpose, an attacker usually embeds, by using various means, attack code in a form of a script, a link, a picture, a flash animation, a plug-in, or the like into a database used by a dynamic page. When a user browses through the attack code by using a browser, the attacker can achieve the purpose.

Considering advantages of a sandbox technology in attack code detection, for example, an unknown attack can be discovered, and no threat is caused to security of a computer that runs a sandbox, a Web sandbox is developed by combining the sandbox technology and a browser technology, and the Web sandbox is used to ensure security of a web page accessed by the browser. The sandbox is a virtual execution environment created in the computer and may be considered as a copy of an operating system. Regardless of a suspicious file that is opened in the sandbox, all operations of the suspicious file on a hard disk in the computer or on a registry in the operating system are directionally assigned to a temporary folder. In this way, even if the suspicious file carries attack code such as a Trojan horse virus or an advertisement plug-in, an affected range is limited to the virtual environment, and a real operating system is not affected. When the sandbox is deleted, a file running in the sandbox is automatically cleared, and the computer is not poisoned. Therefore, the user can run an unknown file in the sandbox, to determine whether the unknown file carries attack code. A detection principle of the Web sandbox is: simulating a real environment of a user browser, detecting and analyzing an action that takes place in a loading process of a current page, and finally determining whether the current page causes a threat to a system environment of the user.

Because a delay loading technology is widely used in an existing Web page, a detection effect is greatly affected when the Web sandbox performs security detection on a web page, and a missed detection phenomenon is especially common. The delay loading technology means that when the user uses the browser to load a uniform/universal resource locator (URL), a Web server does not return, at a time, all content identified by the URL, but obtains only a part of the content from a database and returns the part of content to the user. In this case, the user can view, in a browser interface, only the part of the content returned by the Web server at this time. Downloading resources of a subsequent page (hereinafter referred to as a delay loading page), page loading, and rendering processing are triggered only when the user continues to browse the following web page. After the delay loading technology is used, a network throughput may be reduced, a loading speed of the user browser may be increased, and a waiting time of the user may be shortened, so that user experience is improved. Therefore, the delay loading technology is a widely used technology. However, when the Web sandbox is used to perform security detection on the web page, attack code embedded in the delay loading page cannot be detected, and a missed detection problem of the Web sandbox is caused.

SUMMARY

Embodiments of this application provide a threat detection method and apparatus, and a network system, so that a missed detection problem of a Web sandbox in a delay loading scenario can be resolved.

To achieve the foregoing objective, the following technical solutions are used in the embodiments of this application.

According to a first aspect, an embodiment of this application provides a threat detection method. First, when loading a uniform resource locator URL in a browser of a Web sandbox, a threat detection apparatus obtains, from a Web server, page code of a first display page group identified by the URL and an overall size occupied by the first display page group in a display area of the browser, where the page code of the first display page group includes monitoring code, the monitoring code is used to obtain and monitor a value of a display variable, and the value of the display variable is used to represent a size occupied, in the display area of the browser, by display pages that have been displayed from a start location of a first display page to a current display page in the first display page group. Then, the threat detection apparatus injects preset dynamic code into the obtained page code of the first display page group, parses and executes the page code that is of the first display page group and that includes the preset dynamic code, and displays, in a sequential manner, display pages in the first display page group, where the preset dynamic code is used to trigger switching from the current display page to a next display page of the current display page. Then, when the threat detection apparatus detects that the value of the display variable is greater than or equal to a preset value, the threat detection apparatus sends, to the Web server, a request message that carries a display page group identifier, to request to obtain page code of a second display page group from the Web server, where a first display page in the second display page group is a next display page of a last display page in the first display page group, and the preset value is greater than or equal to a size occupied by the first display page in the first display page group in the display area of the browser and less than the overall size occupied by the first display page group in the display area of the browser. Finally, the threat detection apparatus receives a response message sent by the Web server in response to the request message, where the response message includes the page code of the second display page group, and detects, in the sandbox, whether the obtained page code of the second display page group carries attack code.

In this embodiment of this application, the preset dynamic code is used to trigger the threat detection apparatus to switch from the current display page to the next display page of the current display page, that is, the preset dynamic code can implement a function of automatically scrolling from the current display page to the next display page of the current display page, and the function is equivalent to a human-machine interaction process. The preset dynamic code is used to implement automatically scrolling from the current display page to the next display page of the current display page. Therefore, in this embodiment of this application, when the threat detection apparatus displays the last display page in the first display page group, under an action of the preset dynamic code, the threat detection apparatus needs to continue to display the first display page in the second display page group, so as to trigger the threat detection apparatus to obtain the page code of the second display page group, so that the threat detection apparatus detects, in the Web sandbox, whether the page code of the second display page group carries attack code. In this way, in a delay loading scenario, the threat detection apparatus can detect, in the Web sandbox, whether delay loaded page code carries attack code, and a missed detection problem of the Web sandbox is avoided.

Optionally, in this embodiment of this application, the threat detection apparatus may receive, by using a Socket interface, the page code that is of the first display page group and that is sent by the Web server.

Specifically, in this scenario, the threat detection apparatus may inject the preset dynamic code into the page code of the first display page group when receiving the page code of the first display page group by using the Socket interface.

Optionally, a hook program is set to hook a network layer protocol processing function of the Web sandbox in this embodiment of this application, and the hook program is used to intercept the page code of the first display page group. In this case, the threat detection apparatus injects the preset dynamic code into the page code of the first display page group when the hook program obtains the page code of the first display page group.

Optionally, a hook program is set to hook a browser kernel of the Web sandbox in the threat detection apparatus, and the hook program is used to intercept the page code of the first display page group. In this case, the threat detection apparatus injects the preset dynamic code into the page code of the first display page group when the hook program obtains the page code of the first display page group.

It can be learned from the foregoing descriptions that in this embodiment of this application, the threat detection apparatus may inject the preset dynamic code into the first display page group at different moments, and an injection time is relatively flexible.

Optionally, in this embodiment of this application, the dynamic code is placed at an end of the page code of the first display page group.

The threat detection apparatus places the preset dynamic code at the end of the page code of the first display page group, so that an existing structure of the page code of the first display page group is not affected, it is easy for a developer to identify, and code implementation is relatively simple.

According to a second aspect, an embodiment of this application provides a threat detection apparatus, where the threat detection apparatus includes a processing unit, a display unit, a sending unit, and a receiving unit.

Specifically, functions implemented by the unit modules provided in this embodiment of this application are as follows:

The processing unit is configured to: when loading a uniform resource locator URL in a browser of a Web sandbox, obtain, from a Web server, page code of a first display page group identified by the URL and an overall size occupied by the first display page group in a display area of the browser, where the page code of the first display page group includes monitoring code, the monitoring code is used to obtain and monitor a value of a display variable, and the value of the display variable is used to represent a size occupied, in the display area of the browser, by display pages that have been displayed from a start location of a first display page to a current display page in the first display page group; configured to inject preset dynamic code into the page code of the first display page group, where the preset dynamic code is used to trigger switching from the current display page to a next display page of the current display page; and configured to parse and execute the page code that is of the first display page group and that includes the preset dynamic code.

The display unit is configured to display, in a sequential manner, display pages in the first display page group according to the page code, parsed and executed by the processing unit, that is of the first display page group and that includes the preset dynamic code.

The sending unit is configured to send a request message to the Web server when the processing unit detects that the value of the display variable is greater than or equal to a preset value, where the request message is used to request to obtain page code of a second display page group from the Web server, a first display page in the second display page group is a next display page of a last display page in the first display page group, and the preset value is greater than or equal to a size occupied by the first display page in the first display page group in the display area of the browser and less than the overall size occupied by the first display page group in the display area of the browser.

The receiving unit is configured to receive a response message sent by the Web server, where the response message includes the page code of the second display page group.

The processing unit is further configured to detect, in the Web sandbox, whether the page code that is of the second display page group and that is received by the receiving unit carries attack code.

In this embodiment of this application, the preset dynamic code is used to trigger switching from the current display page to the next display page of the current display page, that is, the preset dynamic code can implement a function of automatically scrolling from the current display page to the next display page of the current display page. In this embodiment of this application, the threat detection apparatus injects the preset dynamic code into the obtained page code of the first display page group, so that the threat detection apparatus can automatically display all display pages in the first display page group sequentially. When the value of the display variable is greater than or equal to the preset value, the threat detection apparatus is triggered to interact with the Web server to obtain the page code of the second display page group, so that the threat detection apparatus can detect, in the Web sandbox, whether the page code of the second display page group carries attack code, and a missed detection problem of the Web sandbox is avoided.

Optionally, the processing unit is specifically configured to receive, by using a Socket interface, the page code that is of the first display page group identified by the URL and that is sent by the Web server.

Optionally, a hook program is set to hook a network layer protocol processing function of the Web sandbox, and the hook program is used to intercept the page code of the first display page group. The processing unit is specifically configured to inject the preset dynamic code into the page code of the first display page group when the hook program obtains the page code of the first display page group.

Optionally, a hook program is set to hook a browser kernel of the Web sandbox, and the hook program is used to intercept the page code of the first display page group. The processing unit is specifically configured to inject the preset dynamic code into the page code of the first display page group when the hook program obtains the page code of the first display page group.

Optionally, in this embodiment of this application, the preset dynamic code is placed at an end of the page code of the first display page group.

According to a third aspect, another embodiment of this application provides a computer readable storage medium, and the computer readable storage medium includes one or more pieces of program code. When the processor in the threat detection apparatus executes the program code, the threat detection apparatus executes the threat detection method according to any one of the foregoing aspects and various optional implementations thereof.

For a technical effect of the computer readable storage medium provided in this embodiment of this application, refer to a corresponding technical effect of any one of the foregoing aspects and various optional implementations thereof. Details are not described herein again.

According to a fourth aspect, another embodiment of this application provides a network system, including at least one threat detection apparatus according to any one of the foregoing aspects and various optional implementations thereof and a Web server. Each threat detection apparatus of the at least one threat detection apparatus is connected to the Web server by using a network.

Specifically, the Web server is configured to send corresponding page code to the threat detection apparatus according to a request sent by the threat detection apparatus, so that the threat detection apparatus detects, in a Web sandbox, whether the received page code of a display page group carries attack code.

Optionally, the Web server sends, to the threat detection apparatus according to a uniform resource locator URL sent by the threat detection apparatus, page code of a first display page group identified by the URL. The Web server sends page code of a second display page group to the threat detection apparatus according to a request message that is sent by the threat detection apparatus and that is used to request to obtain the page code of the second display page group.

For a technical effect of the network system provided in this embodiment of this application, refer to the technical effect of the threat detection apparatus described in the threat detection method executed by the threat detection apparatus according to any one of the foregoing aspects and various optional implementations thereof. Details are not described herein again.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application.

DESCRIPTION OF EMBODIMENTS

Figure 1:
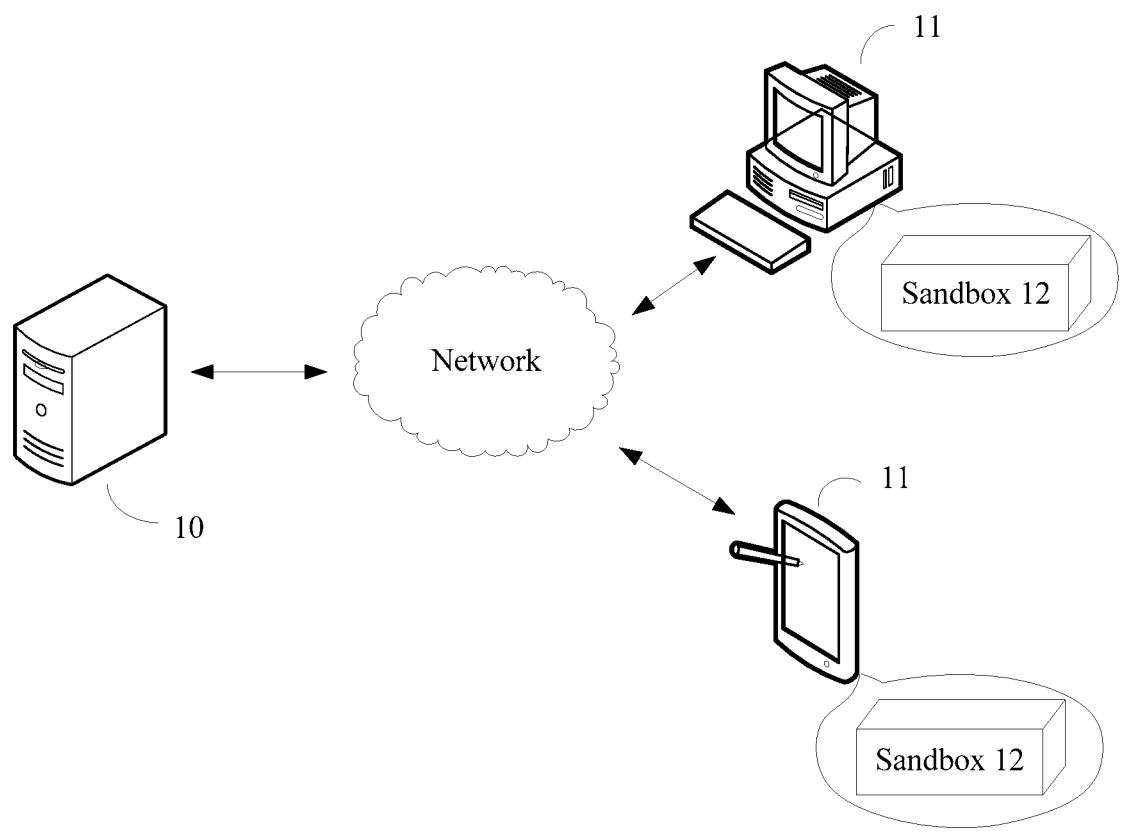
FIG. 1 is a first schematic structural diagram of composition of a network system according to an embodiment of this application.

The following describes in detail the technical solutions in the embodiments of this application with reference to the accompanying drawings in the embodiments of this application.

In the following description, to illustrate rather than limit, specific details such as a particular system structure, an interface, and a technology are provided to make a thorough understanding of this application. However, a person skilled in the art should know that this application may be practiced in other embodiments without these specific details. In other cases, detailed descriptions of well-known apparatuses, circuits, and methods are omitted, so that this application is described without being obscured by unnecessary details.

In addition, the terms "include", "have", or any other variant thereof mentioned in the specification, claims, and the accompanying drawings of this application, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Embodiments of this application may be implemented as a computer implementation process (method), a computing system, or a product such as a computer program product or a computer readable medium. The computer program product may be a computer storage medium that is readable in a computer system and that is encoded to include a computer program that is used to enable a computer or a computer system to execute an instruction of an example process. A computer readable storage medium is a non-transient computer readable storage device. For example, the computer readable storage medium may be implemented by using one or more of a volatile computer memory, a non-volatile memory, a hard disk drive, a flash drive, a floppy disk, a compact disc, or a similar medium.

The term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the specification, claims, and accompanying drawings of this application, the terms "first", "second", and so on are intended to distinguish between different objects but do not indicate a particular order.

In a delay loading scenario, to resolve a missed detection problem of a Web sandbox that exists when the Web sandbox performs security detection on a web page, the embodiments of this application provide a threat detection method. A threat detection apparatus injects, into page code that is of a first display page group identified by a URL and that is obtained by the threat detection apparatus, preset dynamic code that is used to trigger switching from a current display page to a next display page of the current display page, so that the threat detection apparatus can automatically display all display pages in the first display page group sequentially. Under an action of a function of automatically scrolling to a next display page, interaction between the threat detection apparatus and a Web server is implemented, and page code of a second display page group is obtained, so that the threat detection apparatus detects, in the Web sandbox, whether the page code of the second display page group carries attack code, and the missed detection problem of the Web sandbox is avoided.

The threat detection apparatus in the embodiments of this application may be a user terminal in which a Web sandbox is established, or may be a security detection device in which a Web sandbox is established, where the security detection device is located between a Web server and a user terminal, or may be a dedicated bypass detection device in which a Web sandbox is established. A Web sandbox may be established in a virtual operating system of the dedicated bypass detection device, or may be established in a real operating system of the dedicated bypass detection device.

The user terminal may be a wireless terminal or a wired terminal. The wireless terminal may be a device that provides voice and/or data connectivity for a user, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer with a mobile terminal, or may be a portable, pocket-sized, handheld, computer built-in, or in-vehicle mobile apparatus, and exchanges voice and/or data with the radio access network. For example, the wireless terminal may be a device such as a personal communication service (PCS) phone, a cordless phone, a Session Initiation Protocol (SIP) phone, a wireless local loop (WLL) station, or a personal digital assistant (PDA). The wireless terminal may be also referred to as a user agent, a user device, or user equipment (UE).

The threat detection method provided in the embodiments of this application is applied to a network system. The network system includes at least one threat detection apparatus and a Web server.

Optionally, with reference to the foregoing descriptions, if the threat detection apparatus is a user terminal in which a Web sandbox is established, a structure of a network system to which the threat detection method provided in the embodiments of this application is applied is shown in FIG. 1. Referring to FIG. 1, the network system includes a Web server 10 and at least one user terminal 11 in which a Web sandbox 12 is established, and the Web server 10 is connected to each user terminal 11 by using a network.

The Web server 10 stores a text, a medium, and other information, such as an audio, a video, an image, a chart, a diagram, and a table. The Web server 10 mainly provides content or a service for the user terminal 11. For example, the Web server 10 sends page code corresponding to a URL to the user terminal 11.

Optionally, the Web server 10 in this embodiment of this application may be a computing device that executes one or more software programs in a networking environment, or may be considered as a virtual Web server executed on one or more computing devices of a Web server in a network, and the virtual Web server is implemented by using a software program.

The Web sandbox 12 is established in the user terminal 11. The user terminal 11 may communicate, by using a predefined communications protocol, with the Web sandbox 12 established in the user terminal 11. The user terminal 11 may request, by using the Web sandbox 12, to obtain page code from the Web server 10. Content represented by the page code may include components of a website, such as an image, a text component, a medium, or any combination thereof. The user terminal 11 may detect, in the Web sandbox 12, whether the page code sent by the Web server 10 to the user terminal 11 carries attack code.

The network in this embodiment of this application may be any network architecture provided by using a wired or wireless technology.

Figure 2:
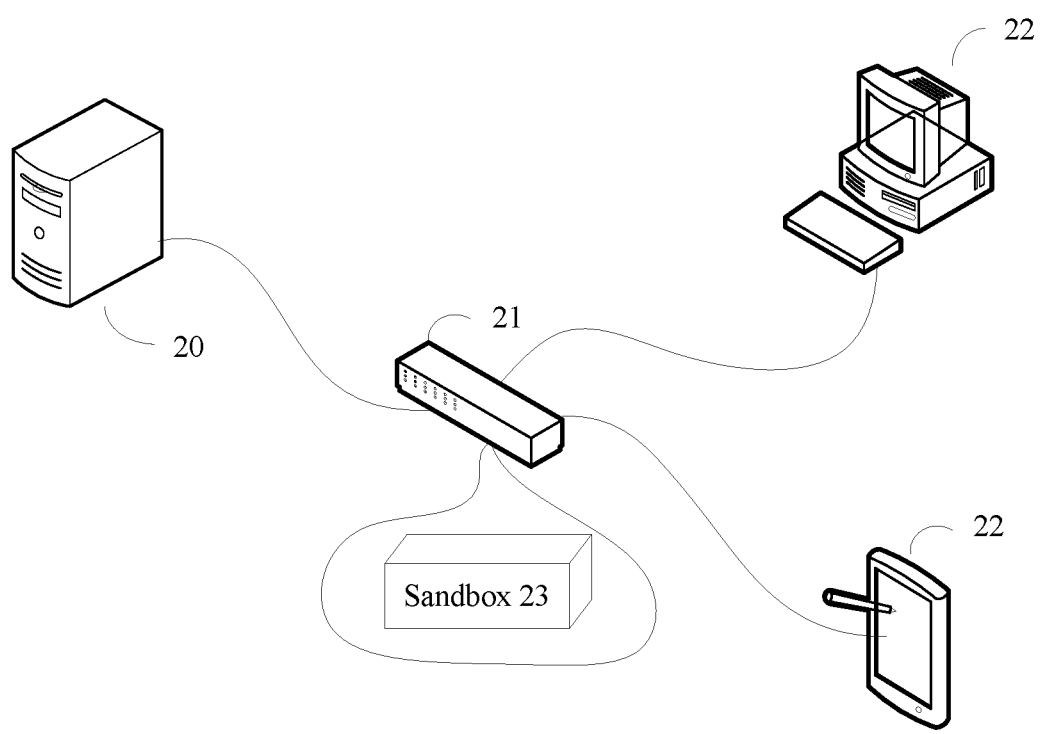
FIG. 2 is a second schematic structural diagram of composition of a network system according to an embodiment of this application.

Optionally, with reference to the foregoing descriptions, if the threat detection apparatus is a security device in which a Web sandbox is established, a structure of a network system to which the threat detection method provided in the embodiments of this application is applied is shown in FIG. 2. Referring to FIG. 2, the network system includes a Web server 20, a security device 21 in which a Web sandbox 23 is established, and at least one user terminal 22. The Web server 20 is connected to the security device 21 by using a network, and the security device 21 is connected to each user terminal 22 by using a network.

A function that can be implemented by the Web server 20 in this embodiment of this application is the same as the function implemented by the Web server 10 in the foregoing example, and details are not described herein again.

The Web sandbox 23 is established in the security device 21. The security device 21 may communicate, by using a predefined communications protocol, with the Web sandbox 23 established in the security device 21. The security device 21 may request, by using the Web sandbox 23, to obtain page code from the Web server 20. The security device 21 may detect, in the Web sandbox 23, whether the page code sent by the Web server 20 to the security device 21 carries attack code.

The user terminal 22 interacts with the security device 21, and can obtain a detection result of detecting, by the security device 21, whether page code carries attack code.

Figure 3:
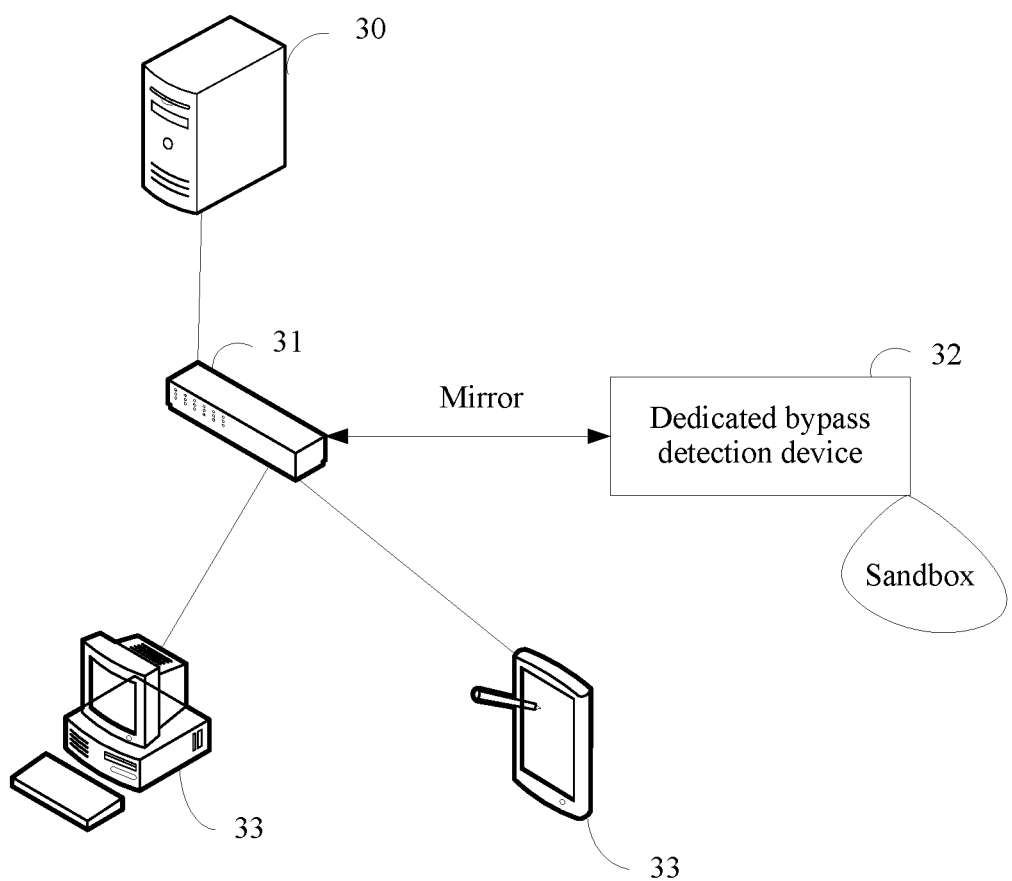
FIG. 3 is a third schematic structural diagram of composition of a network system according to an embodiment of this application.

Optionally, with reference to the foregoing descriptions, if the threat detection apparatus is a dedicated bypass detection device in which a Web sandbox is established, a structure of a network system to which the threat detection method provided in the embodiments of this application is applied is shown in FIG. 3. Referring to FIG. 3, the network system includes a Web server 30, a switch 31, a dedicated bypass detection device 32 in which a Web sandbox is established, and at least one user terminal 33. The Web server 30 is connected to the switch 31 by using a network, the switch 31 is connected to the dedicated bypass detection device 32 by using a network, and the switch 31 is connected to each user terminal 33 by using a network.

A function that can be implemented by the Web server 30 in this embodiment of this application is the same as the function implemented by the Web server 10 in the foregoing example, and details are not described herein again.

When detecting a request message that includes a URL and that is sent by the user terminal 33 to the Web server 30, the switch 31 mirrors the request, that is, copies the request message that includes the URL, and sends the request message to the dedicated bypass detection device 32. The switch 31 in this embodiment of this application may be replaced with a router.

The Web sandbox in the dedicated bypass detection device 32 may be established in a virtual operating system of the dedicated bypass detection device, or may be established in a real operating system of the dedicated bypass detection device. The dedicated bypass detection device 32 may communicate, by using a predefined communications protocol, with the Web sandbox established in the dedicated bypass detection device 32. After obtaining the request message that includes the URL, the dedicated bypass detection device 32 may request, by using the Web sandbox in the dedicated bypass detection device 32, to obtain page code corresponding to the URL from the Web server 30. The dedicated bypass detection device 32 may detect, in the Web sandbox, whether the page code sent by the Web server 30 to the dedicated bypass detection device 32 carries attack code.

The threat detection method and apparatus and the network system provided in the embodiments of this application are applicable to a delay loading scenario.

Figure 4:
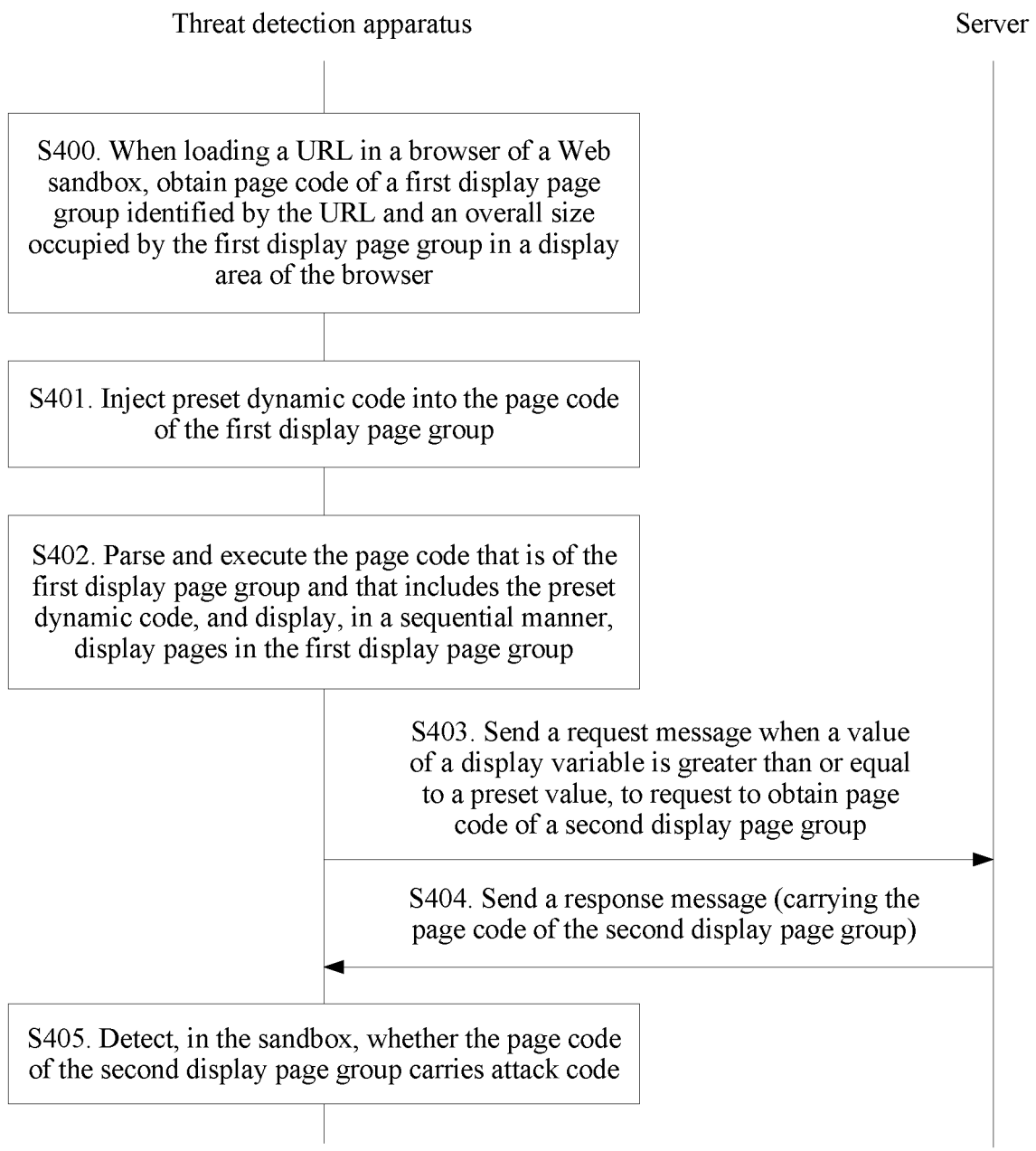
FIG. 4 is a schematic flowchart of a threat detection method according to an embodiment of this application.

FIG. 4 is a schematic flowchart of a threat detection method according to an embodiment of this application. The threat detection method may be applied to the network system shown in any accompanying drawing of FIG. 1 to FIG. 3.

Referring to FIG. 4, the threat detection method includes the following steps.

S400. When loading a URL in a browser of a Web sandbox, a threat detection apparatus obtains, from a Web server, page code of a first display page group identified by the URL and an overall size occupied by the first display page group in a display area of the browser.

The page code of the first display page group includes monitoring code, and the monitoring code is used to obtain and monitor a value of a display variable. The value of the display variable is used to represent a size occupied, in the display area of the browser, by display pages that have been displayed from a start location of a first display page to a current display page in the first display page group.

S401. The threat detection apparatus injects preset dynamic code into the page code of the first display page group.

The preset dynamic code is used to trigger switching from the current display page to a next display page of the current display page, that is, the preset dynamic code can implement a function of automatically scrolling from the current display page to the next display page of the current display page, and the function is equivalent to a human-machine interaction process.

S402. The threat detection apparatus parses and executes the page code that is of the first display page group and that includes the preset dynamic code, and displays, in a sequential manner, display pages in the first display page group.

S403. The threat detection apparatus sends a request message to the Web server when detecting that the value of the display variable is greater than or equal to a preset value, where the request message is used to request to obtain page code of a second display page group from the Web server.

A first display page in the second display page group is a next display page of a last display page in the first display page group. That is, the threat detection apparatus first displays all the display pages of the first display page group, and then displays all display pages of the second display page group.

The preset value is greater than or equal to a size occupied by the first display page in the first display page group in the display area of the browser and less than the overall size occupied by the first display page group in the display area of the browser.

S404. The Web server sends, to the threat detection apparatus, a response message that carries the page code of the second display page group.

S405. The threat detection apparatus detects, in the Web sandbox, whether the page code of the second display page group carries attack code.

In this embodiment of this application, a client that can parse a Web page is built in the Web sandbox of the threat detection apparatus, and the client is a common browser or another application program that integrates a built-in browser.

The application program is a computer program that is developed for completing one or more specific tasks and that runs on an operating system. In this embodiment of this application, the application program that can parse a Web page is an application program that is compatible with a system carried by the Web sandbox of the threat detection apparatus.

For ease of understanding, in this embodiment of this application, that a browser is built in the Web sandbox of the threat detection apparatus is used as an example for description.

Generally, a process in which the threat detection apparatus opens a web page by using the browser in a real operating system of the threat detection apparatus may be considered as a process of communication between the browser in the threat detection apparatus and the Web server. Specifically, in a delay loading scenario, when the browser loads a URL, the browser first obtains, from the Web server, a part of all page code corresponding to the URL, and loads the obtained page code. The browser in the threat detection apparatus continues, only when a user drags a scroll bar down or triggers the display page to slide down, to communicate with the Web server, and obtain and load subsequent page code.

It can be learned that in the delay loading scenario, all the page code corresponding to the URL is divided into several segments of page code by the Web server. For ease of description, in this embodiment of this application, each segment of divided page code is referred to as page code. The Web server returns, according to the request message sent by the threat detection apparatus, page code corresponding to the request message to the threat detection apparatus. Content represented by page code returned by the Web server each time may be displayed on at least one display page. Therefore, the page code returned by the Web server each time is page code of a display page group. The display page group in this embodiment of this application includes at least one display page.

In the delay loading scenario, that the Web server divides all the page code corresponding to the URL pertains to the prior art. For details, refer to descriptions in the prior art, and details are not described in this embodiment of this application.

In this embodiment of this application, when loading the URL in the browser of the Web sandbox, the threat detection apparatus obtains, from the Web server, the page code of the first display page group identified by the URL. The page code of the first display page group is a part of all the page code corresponding to the URL, and the page code of the first display page group is page code obtained by the threat detection apparatus for the first time when the browser in this embodiment of this application loads the URL.

Specifically, in this embodiment of this application, when loading the URL in the browser of the Web sandbox, the threat detection apparatus obtains, from the Web server, the page code of the first display page group identified by the URL and the overall size occupied by the first display page group in the display area of the browser, that is, the threat detection apparatus performs S400.

A method in which the threat detection apparatus obtains, from the Web server, the page code of the first display page group identified by the URL is that the threat detection apparatus sends, to the Web server, the request message that carries the URL, and the Web server sends the page code of the first display page group to the threat detection apparatus according to the URL.

Optionally, the page code of the first display page group may be expressed by using a JavaScript script language, or may be expressed by using a VBScript (Visual Basic Script) script language, or may be expressed by using any other script language used to support web page content. This is not specifically limited in this embodiment of this application.

After obtaining the page code of the first display page group from the Web server, the threat detection apparatus further obtains the overall size occupied by the first display page group in the display area of the browser.

Optionally, in this embodiment of this application, the overall size occupied by the first display page group in the display area of the browser may be a height value of a visible web page area occupied by the first display page group in the display area of the browser, or may be a width value of a visible web page area occupied by the first display page group in the display area of the browser, or may be a width value of a whole web page text occupied by the first display page group in the display area of the browser. This is not specifically limited in this embodiment of this application.

For example, if the page code of the first display page group is expressed by using the JavaScript script language, the threat detection apparatus may obtain, by using a document. body. clientWidth interface, the width value of the visible web page area occupied by the first display page group in the display area of the browser; obtain, by using a document. body. clientHeight interface, the height value of the visible web page area occupied by the first display page group in the display area of the browser; and obtain, by using a document. body. scrollWidth interface, the width value of the whole web page text occupied by the first display page group in the display area of the browser. For definitions of the document. body. clientWidth interface, the document. body. clientHeight interface, and the document. body. scrollWidth interface, refer to a browser communications protocol, and details are not described herein.

In this embodiment of this application, a rectangular coordinate system may be established at any location in a display screen of the threat detection apparatus, and the rectangular coordinate system includes an X axis and a Y axis. A direction that is in any display page in the first display page group and that is parallel to the X axis of the rectangular coordinate system may be defined as width (or height), and a direction that is in the display page and that is parallel to the Y axis of the rectangular coordinate system may be defined as height (or width).

Further, after the threat detection apparatus obtains the page code of the first display page group, the threat detection apparatus injects the preset dynamic code into the obtained page code of the first display page group, that is, the threat detection apparatus performs S401.

In this embodiment of this application, a script language used by the preset dynamic code may be the same as or different from the script language used by the page code of the first display page group. This is not specifically limited in this embodiment of this application. In this embodiment of this application, it only needs to ensure that both the page code of the first display page group and the preset dynamic code can be identified by the threat detection apparatus.

For example, if the preset dynamic code is expressed by using the JavaScript script language, the preset dynamic code may be the following code:

```
<script type="text/javascript">        //code start character//
    var pageHeight;                    //define a variable pageHeight //
    var currentLocate=0;               //define a variable currentLocate, used to
represent the size occupied by the displayed display page in the display area of the browser//
    var scrollTimer;                   //define a timer scrollTimer //
    scrollTimer=setInterval("autoScrollDown( ),10);     //execute an autoScrollDown
function every 10 milliseconds//
    window.onload=function( ){         //executing when a web page is
opened//
        pageHeight=document. body. scrollHeight;   //obtain a height value of a visible
web page area occupied by the obtained page code in the display area of the browser, and assign a
value of a variable pageHeight to the height value of the visible web page area//
    }
    function autoScrollDown( )                      //define the autoScrollDown
function//
    {
        If(currentLocate<pageHeight)
        {
            currentLocate ++;
            scroll(0,currentLocate));//if a value of the variable currentLocate is less than
the height value of the visible web page area, automatically scroll to the next display page//
        }else{
            clearInterval(scrollTimer));//otherwise, delete the timer scrollTimer //
        }
    }
</script>                              //code end character//
```

Specifically, on the premise that a correspondence of labels in the page code of the first display page group is not affected, in this embodiment of this application, the threat detection apparatus may place the preset dynamic code after any script paragraph in the page code of the first display page group.

Optionally, the threat detection apparatus places the preset dynamic code at an end of the page code of the first display page group. In this way, an original structure of the page code of the first display page group is not affected, and it is easy for a developer to identify. In addition, in an actual application, code implementation is relatively simple.

In addition, optionally, in this embodiment of this application, a process in which the threat detection apparatus injects the preset dynamic code into the page code of the first display page group may be that the threat detection apparatus injects the preset dynamic code into the page code of the first display page group when receiving, by using a socket interface, the page code that is of the first display page group and that is sent by the Web server.

A process in which the threat detection apparatus loads the URL in the browser of the Web sandbox may be considered as a process of communication between the browser in the threat detection apparatus and the Web server. Specifically, the browser creates a Socket interface between the browser and the Web server, and sends a request packet to the Web server according to Hypertext Transfer Protocol (HTTP) specifications. The Web server parses, according to the HTTP specifications, the HTTP request packet sent by the browser, and sends a response message to the browser, where the response message includes page code, such as a JavaScript document. The browser parses the page code in the response message, and processes, by means of rendering, the page code into a corresponding Hypertext Markup Language (HTML) page.

Specifically, in this embodiment of this application, when receiving, by using the Socket interface, the response message sent by the Web server, the threat detection apparatus first determines whether the response message includes the page code of the first display page group. If the response message includes the page code of the first display page group, the threat detection apparatus injects the preset dynamic code into the page code of the first display page group.

Optionally, in this embodiment of this application, a hook program is set in the threat detection apparatus. The hook program hooks a network layer protocol processing function of the Web sandbox of the threat detection apparatus, and the hook program is used to intercept the page code of the first display page group. In this embodiment of this application, a process in which the threat detection apparatus injects the preset dynamic code into the page code of the first display page group may be that the threat detection apparatus injects the preset dynamic code into the page code of the first display page group when the hook program obtains the page code of the first display page group.

It may be understood that the Web sandbox is equivalent to a copy of an operating system of the threat detection apparatus. Therefore, the Web sandbox also includes communications protocol layers. In this embodiment of this application, a network layer of the Web sandbox is a protocol layer that has a function of a network layer in a Transmission Control Protocol/Internet Protocol (TCP/IP) model.

For example, if the Web sandbox of the threat detection apparatus runs in a Linux system, an NF_IP_LOCAL_IN hook program of a Linux netfilter mechanism is set in the threat detection apparatus, and the NF_IP_LOCAL_IN hook program hooks the network layer protocol processing function of the Web sandbox. The threat detection apparatus injects the preset dynamic code into the page code of the first display page group when the NF_IP_LOCAL_IN hook program obtains the page code of the first display page group.

Optionally, in this embodiment of this application, a hook program is set in the threat detection apparatus. The hook program hooks a browser kernel of the Web sandbox, and the hook program is used to intercept the page code of the first display page group. In this embodiment of this application, a process in which the threat detection apparatus injects the preset dynamic code into the page code of the first display page group may be that the threat detection apparatus injects the preset dynamic code into the page code of the first display page group when the hook program obtains the page code of the first display page group.

Specifically, the threat detection apparatus injects the preset dynamic code into the page code of the first display page group after the Web sandbox of the threat detection apparatus obtains the page code of the first display page group, before the browser in the Web sandbox starts to parse and render the page code of the first display page group, and when the hook program that hooks the browser kernel of the Web sandbox intercepts the page code of the first display page group.

For example, if the browser in the Web sandbox is a Webkit browser, a browser kernel of the Webkit browser has a void Resource Loader::did Receive Data (Resource Handle*, const char* data, int length, int encoded DataLength) interface, and a hook program is set in the threat detection apparatus to hook the browser kernel of the Webkit browser. When the hook program obtains the page code of the first display page group from a data parameter in the void Resource Loader::did Receive Data (Resource Handle*, const char* data, int length, int encoded DataLength) interface, the threat detection apparatus injects the preset dynamic code into the page code that is of the first display page group and that is indicated by the data parameter.

Regardless of a moment at which the threat detection apparatus injects the preset dynamic code into the page code of the first display page group, the threat detection apparatus can obtain the page code that is of the first display page group and that includes the preset dynamic code.

After the threat detection apparatus obtains the page code that is of the first display page group and that includes the preset dynamic code, the threat detection apparatus parses and executes the page code that is of the first display page group and that includes the preset dynamic code, and sequentially displays the display pages in the first display page group, that is, the threat detection apparatus performs S402.

In this embodiment of this application, the preset dynamic code is used to trigger switching from the current display page to the next display page of the current display page, that is, the preset dynamic code can implement the function of automatically scrolling from the current display page to the next display page of the current display page, and the function is equivalent to a human-machine interaction process.

It can be learned from the foregoing descriptions that the first display page group includes at least one display page. Therefore, when the threat detection apparatus parses and executes the page code that is of the first display page group and that includes the preset dynamic code, the threat detection apparatus sequentially displays the display pages in the first display page group.

Further, when the threat detection apparatus parses and executes the page code that is of the first display page group and that includes the preset dynamic code, the threat detection apparatus monitors a change of the value of the display variable.

It can be learned from the foregoing descriptions that the value of the display variable is used to represent the size occupied, in the display area of the browser, by the display pages that have been displayed from the start location of the first display page to the current display page in the first display page group. It is easily understood that when the threat detection apparatus sequentially displays the display pages in the first display page group, the value of the display variable gradually increases.

The value of the display variable may represent a width value of a visible web page area occupied by a displayed display page in the display area of the browser, or may represent a height value of a visible web page area occupied by a displayed display page in the display area of the browser.

Specifically, when the threat detection apparatus detects that the value of the display variable is greater than or equal to the preset value, the threat detection apparatus sends the request message to the Web server, that is, the threat detection apparatus performs S403.

The request message sent by the threat detection apparatus carries a display page group identifier, and the Web server determines, according to the display page group identifier, page code that is of a display page group and that needs to be obtained by the threat detection apparatus.

The display page group identifier may be an identifier of the first display page group, or may be an identifier of the second display page group. This is not specifically limited in this embodiment of this application. In this embodiment of this application, if the request message carries the identifier of the first display page group, the Web server searches, according to the identifier of the first display page group, for the page code of the second display page group after the first display page group identified by the identifier of the first display page group, and returns the page code of the second display page group. In this embodiment of this application, if the request message carries the identifier of the second display page group, the Web server searches, according to the identifier of the second display page group, for the page code of the second display page group identified by the identifier of the second display page group, and returns the page code of the second display page group.

In this embodiment of this application, if the display page group identifier carried in the request message is the identifier of the second display page group, the display page group identifier may be a display order of the second display page group in all display page groups, or may be index information of the second display page group. This is not specifically limited in this embodiment of this application.

For example, if the display order of the second display page group in all the display page groups is 2, the request message may carry operation code "get page2".

Further, after the threat detection apparatus sends the request message to the Web server, the Web server sends the response message to the threat detection apparatus in response to the request message, where the response message carries the page code of the second display page group, that is, S404 is performed.

Correspondingly, the threat detection apparatus may obtain the page code of the second display page group.

Further, the threat detection apparatus detects, in the Web sandbox, whether the page code of the second display page group carries attack code, that is, the threat detection apparatus performs S405.

For a process in which the threat detection apparatus detects, in the Web sandbox, whether the page code of the second display page group carries attack code, refer to an existing detection principle of a Web sandbox, and details are not described herein.

The page code of the second display page group is delay loaded page code. Therefore, according to the threat detection method provided in this application, the threat detection apparatus can detect whether a delay loading page carries attack code, and a missed detection problem of the Web sandbox is avoided.

After the threat detection apparatus obtains the page code of the second display page group, the page code of the first display page group and the page code of the second display page group are combined into one piece of page code. In this case, the threat detection apparatus continues running the preset dynamic code. Therefore, the threat detection apparatus continues automatically switching the display page. When the threat detection apparatus automatically switches the display page, the threat detection apparatus is triggered to continue interacting with the Web server, obtain page code of a subsequent display page group, and detect the page code of the subsequent display page group, until all display pages corresponding to the URL are loaded, and then the process ends.

For example, if the preset dynamic code is the code shown in the foregoing example, in the preset dynamic code shown in the foregoing example, if the value of the variable currentLocate is less than the value of the variable pageHeight, the current display page automatically scrolls to the next display page. After the threat detection apparatus obtains the page code of the second display page group, the value of the variable pageHeight obtained by the threat detection apparatus increases accordingly. Therefore, the threat detection apparatus continues automatically switching the display page.

It can be learned from the foregoing descriptions that according to the threat detection method provided in this embodiment of this application, the threat detection apparatus may obtain delay loaded page code in the Web sandbox, and may detect, in the Web sandbox, whether the delay loaded page code carries attack code. In this way, the missed detection problem of the Web sandbox is avoided.

An embodiment of this application provides a threat detection apparatus 1. The threat detection apparatus 1 is configured to perform steps performed by the threat detection apparatus in the foregoing threat detection method. The threat detection apparatus 1 may include modules corresponding to the corresponding steps.

Figure 5:
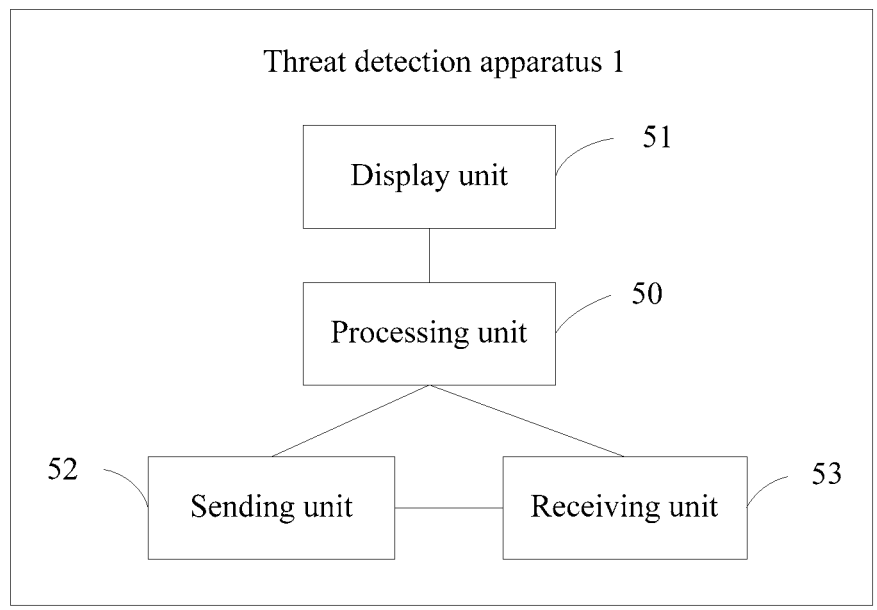
FIG. 5 is a first schematic structural diagram of a threat detection apparatus according to an embodiment of this application.

As shown in FIG. 5, the threat detection apparatus 1 includes a processing unit 50, a display unit 51, a sending unit 52, and a receiving unit 53.

The processing unit 50 is configured to: when loading a uniform resource locator URL in a browser of a Web sandbox, obtain, from a Web server, page code of a first display page group identified by the URL and an overall size occupied by the first display page group in a display area of the browser, where the page code of the first display page group includes monitoring code, the monitoring code is used to obtain and monitor a value of a display variable, and the value of the display variable is used to represent a size occupied, in the display area of the browser, by display pages that have been displayed from a start location of a first display page to a current display page in the first display page group; configured to inject preset dynamic code into the page code of the first display page group, where the preset dynamic code is used to trigger switching from the current display page to a next display page of the current display page; and configured to parse and execute the page code that is of the first display page group and that includes the preset dynamic code.

The display unit 51 is configured to display, in a sequential manner, display pages in the first display page group according to the page code, parsed and executed by the processing unit 50, that is of the first display page group and that includes the preset dynamic code.

The sending unit 52 is configured to send a request message to the Web server when the processing unit 50 detects, by using the monitoring code, that the value of the display variable is greater than or equal to a preset value, where the request message is used to request to obtain page code of a second display page group from the Web server, a first display page in the second display page group is a next display page of a last display page in the first display page group, and the preset value is greater than or equal to a size occupied by the first display page in the first display page group in the display area of the browser and less than the overall size occupied by the first display page group in the display area of the browser.

The receiving unit 53 is configured to receive a response message sent by the Web server, where the response message includes the page code of the second display page group.

The processing unit 50 is further configured to detect, in the Web sandbox, whether the page code that is of the second display page group and that is received by the receiving unit 53 carries attack code.

Further, the processing unit 50 is specifically configured to receive, by using a Socket interface, the page code that is of the first display page group identified by the URL and that is sent by the Web server.

Optionally, in this embodiment of this application, a hook program is set in the threat detection apparatus 1 to hook a network layer protocol processing function of the Web sandbox, and the hook program is used to intercept the page code of the first display page group. The processing unit 50 is specifically configured to inject the preset dynamic code into the page code of the first display page group when the hook program obtains the page code of the first display page group.

Optionally, in this embodiment of this application, a hook program is set in the threat detection apparatus 1 to hook a browser kernel of the Web sandbox, and the hook program is used to intercept the page code of the first display page group. The processing unit 50 is specifically configured to inject the preset dynamic code into the page code of the first display page group when the hook program obtains the page code of the first display page group.

Optionally, the preset dynamic code is placed at an end of the page code of the first display page group.

It may be understood that the threat detection apparatus 1 in this embodiment of this application is merely logically divided according to functions implemented by the threat detection apparatus 1. In an actual application, the foregoing units may be superposed or divided.

The function implemented by the threat detection apparatus 1 provided in this embodiment of this application is in a one-to-one correspondence with the threat detection method provided in the foregoing embodiment. A more detailed processing process implemented by the threat detection apparatus 1 has been described in detail in the foregoing method embodiment, and details are not described herein again.

Figure 6:
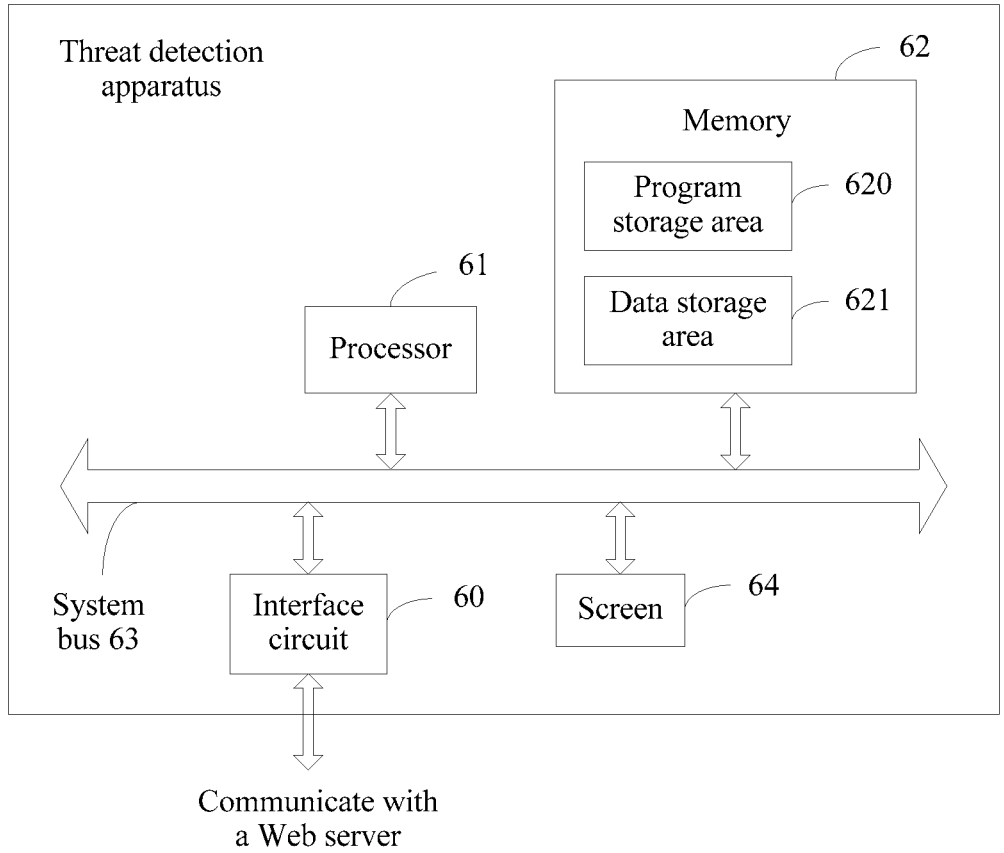
FIG. 6 is a second schematic structural diagram of a threat detection apparatus according to an embodiment of this application.

Another embodiment of this application provides a threat detection apparatus. As shown in FIG. 6, the threat detection apparatus includes an interface circuit 60, a processor 61, a memory 62, a system bus 63, and a screen 64.

The interface circuit 60, the processor 61, the memory 62, and the screen 64 are connected by using the system bus 63 and complete mutual communication.

A person skilled in the art may understand that a structure of the threat detection apparatus shown in FIG. 6 does not constitute any limitation to the threat detection apparatus. The threat detection apparatus may include components more or fewer than those shown in FIG. 6, or combine some components, or have different component arrangements.

Specifically, when the threat detection apparatus runs, the threat detection apparatus executes the threat detection method in the embodiment shown in FIG. 4. For the specific threat detection method, refer to related descriptions in the embodiment shown in FIG. 4, and details are not described herein again.

In this embodiment of this application, a Web sandbox is established in the threat detection apparatus.

With reference to the foregoing embodiment, the interface circuit 60 in this embodiment of this application may be the sending unit 52 in the foregoing embodiment, and may be the receiving unit 53 in the foregoing embodiment.

Specifically, the interface circuit 60 is configured to implement communication connection between the threat detection apparatus and a Web server.

With reference to the foregoing embodiment, the memory 62 in this embodiment of this application may be the processing unit 50 in the foregoing embodiment.

Specifically, the memory 62 may be configured to store a software program and an application module. By running the software program and the application module that are stored in the memory 62, the processor 61 executes various functional applications of the threat detection apparatus and processes data.

The memory 62 may mainly include a program storage area 620 and a data storage area 621. The program storage area 620 may store an operating system, an application program required by at least one function, such as a function of sending a request message. The data storage area 621 may store page code sent by the Web server, for example, save page code of a first display page group and page code of a second display page group.

The memory 62 may include a volatile memory, such as a high-speed random access memory (RAM). The memory 62 may also include a non-volatile memory, such as at least one magnetic disk storage component, a flash memory component, or another volatile solid-state storage component. This is not specifically limited in this embodiment of this application.

With reference to the foregoing embodiment, the processor 61 in this embodiment of this application may be the processing unit 50 in the foregoing embodiment.

Specifically, the processor 61 is a control center of the threat detection apparatus.

The processor 61 is connected to all parts of the entire threat detection apparatus by using various interfaces and lines. The processor 62 runs or executes the software program and/or the application module stored in the memory 62, and invokes data stored in the memory 62, to execute various functions of the threat detection apparatus and process data, so as to monitor the entire threat detection apparatus.

Optionally, the processor 61 may be a central processing unit (CPU). The processor 61 may also be another general processor, a digital signal processor (DSP) or another programmable logic device or transistor logic device, a discrete hardware component, or the like. This is not specifically limited in this embodiment of this application.

The general processor may be a microprocessor, or the processor may be any conventional processor, or the like.

The system bus 63 may include a data bus, a power bus, a control bus, a signal status bus, or the like.

In this embodiment of this application, for a clear description, various buses are represented by the system bus 63 in FIG. 6.

With reference to the foregoing embodiment, the screen 64 in this embodiment of this application may be the display unit 51 in the foregoing embodiment.

This embodiment of this application provides the threat detection apparatus. The threat detection apparatus stores preset dynamic code, and the preset dynamic code is used to trigger the threat detection apparatus to switch from a current display page to a next display page of the current display page. Therefore, when running the page code of the first display page group and the preset dynamic code, the threat detection apparatus displays, in a sequential manner, display pages in the first display page group. When the threat detection apparatus detects that a value of a display variable is greater than or equal to a preset value, the threat detection apparatus interacts with the Web server to obtain the page code of the second display page group. In this way, in a delay loading scenario, the threat detection apparatus can obtain delay loaded page code in the Web sandbox, so that the threat detection apparatus detects, in the Web sandbox, whether the delay loaded page code carries attack code, and missed detection in the Web sandbox by the threat detection apparatus on the delay loaded page code is avoided.

When the threat detection method in the embodiment shown in FIG. 4 is implemented in a form of a software functional module and sold or used as an independent product, the threat detection method may be stored in a computer readable storage medium. Based on such an understanding, a person skilled in the art should understand that the embodiments of this application may be provided as a method, an electronic device, or a computer program product. Therefore, this application may use a form of hardware only embodiments, software only embodiments, or embodiments with a combination of software and hardware. In addition, this application may use a form of a computer program product implemented on one or more computer readable storage mediums that include program code. The computer storage medium includes but is not limited to a USB flash drive, a removable hard disk, a read-only memory (ROM), a magnetic disk memory, a CD-ROM, an optical memory, or the like.

Correspondingly, this embodiment of this application further provides a computer readable storage medium, and the computer readable storage medium includes one or more pieces of program code. When the processor in the threat detection apparatus executes the program code, the threat detection apparatus executes the threat detection method shown in FIG. 4.

Figure 7:
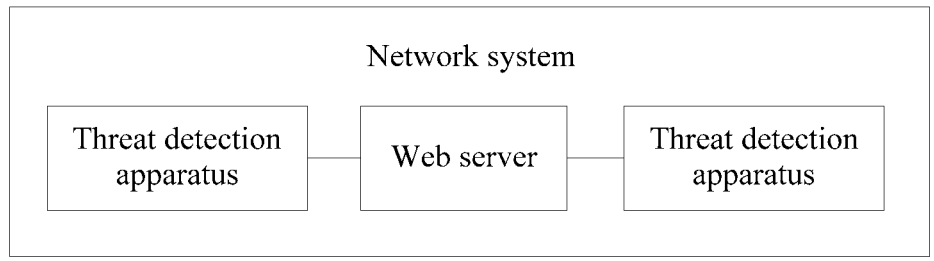
FIG. 7 is a schematic structural diagram of a network system according to an embodiment of this application.

An embodiment of this application further provides a network system. As shown in FIG. 7, the network system includes at least one threat detection apparatus according to the foregoing embodiments and a Web server.

Specifically, the Web server is configured to send corresponding page code to the threat detection apparatus according to a request sent by the threat detection apparatus, so that the threat detection apparatus detects, in a Web sandbox, whether the received page code of a display page group carries attack code.

Optionally, the Web server sends, to the threat detection apparatus according to a uniform resource locator URL sent by the threat detection apparatus, page code of a first display page group identified by the URL. The Web server sends page code of a second display page group to the threat detection apparatus according to a request message that is sent by the threat detection apparatus and that is used to request to obtain the page code of the second display page group.

A more detailed processing process implemented by the Web server has been described in detail in the foregoing embodiment, and details are not described herein again.

A more detailed processing process implemented by the threat detection apparatus has been described in detail in the foregoing embodiment, and details are not described herein again.

This embodiment of this application provides the network system. The threat detection apparatus in the network system stores preset dynamic code, and the preset dynamic code is used to trigger the threat detection apparatus to switch from a current display page to a next display page of the current display page. Therefore, when running the page code of the first display page group and the preset dynamic code, the threat detection apparatus displays, in a sequential manner, display pages in the first display page group. When the threat detection apparatus detects that a value of a display variable is greater than or equal to a preset value, the threat detection apparatus interacts with the Web server to obtain the page code of the second display page group. In this way, in a delay loading scenario, the threat detection apparatus can obtain delay loaded page code in the Web sandbox, so that the threat detection apparatus detects, in the Web sandbox, whether the delay loaded page code carries attack code, and missed detection in the Web sandbox by the threat detection apparatus on the delay loaded page code is avoided.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or a part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners.

For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium.

Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Although some embodiments of this application have been described, a person skilled in the art can make changes and modifications to these embodiments once they learn the basic inventive concept. Therefore, the following claims are intended to be construed as to cover the embodiments and all changes and modifications falling within the scope of this application.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A threat detection method, comprising:
   when loading a uniform resource locator (URL) in a browser of a Web sandbox, obtaining, by a threat detection apparatus from a Web server, page code of a first display page group identified by the URL;
   injecting, by the threat detection apparatus, preset dynamic code into the page code of the first display page group to trigger switching from a current display page to a next display page of the current display page;
   parsing and executing, by the threat detection apparatus, the page code that is of the first display page group and that comprises the preset dynamic code;
   displaying, in a sequential manner, display pages in the first display page group in a display area of the browser based on an execution of the preset dynamic code that is injected into the page code of the first display page group, wherein the preset dynamic code is executed to implement automatically scrolling from the current display page to a next display page of the current display page in the first display page group;
   sending a request message to the Web server when the threat detection apparatus detects that display pages that have been displayed in the display area of the browser is greater than or equal to a preset value, wherein the request message is used to request to obtain page code of a second display page group from the Web server, wherein a first display page in the second display page group is a next display page of a last display page in the first display page group, and wherein the preset value is greater than or equal to one display page in the first display page group and less than the overall display pages in the first display page group;
   receiving, by the threat detection apparatus, a response message sent by the Web server, wherein the response message carries the page code of the second display page group; and
   detecting, by the threat detection apparatus in the Web sandbox, whether the page code of the second display page group carries attack code.

2. The threat detection method according to claim 1, wherein obtaining, by a threat detection apparatus from a Web server, page code of a first display page group identified by the URL comprises:
   receiving, by the threat detection apparatus using a Socket interface, the page code that is of the first display page group identified by the URL and that is sent by the Web server.

3. The threat detection method according to claim 1, further comprising:
   setting a hook program to hook a network layer protocol processing function of the Web sandbox, wherein the hook program is used to intercept the page code of the first display page group; and
   wherein injecting, by the threat detection apparatus, preset dynamic code into the page code of the first display page group comprises:
   injecting, by the threat detection apparatus, the preset dynamic code into the page code of the first display page group when the hook program obtains the page code of the first display page group.

4. The threat detection method according to claim 2, further comprising:
   setting a hook program to hook a network layer protocol processing function of the Web sandbox, wherein the hook program is used to intercept the page code of the first display page group; and
   wherein injecting, by the threat detection apparatus, preset dynamic code into the page code of the first display page group comprises:
   injecting, by the threat detection apparatus, the preset dynamic code into the page code of the first display page group when the hook program obtains the page code of the first display page group.

5. The threat detection method according to claim 1, further comprising:
   setting a hook program to hook a browser kernel of the Web sandbox, wherein the hook program is used to intercept the page code of the first display page group; and
   wherein injecting, by the threat detection apparatus, preset dynamic code into the page code of the first display page group comprises:
   injecting, by the threat detection apparatus, the preset dynamic code into the page code of the first display page group when the hook program obtains the page code of the first display page group.

6. The threat detection method according to claim 2, further comprising:
setting a hook program to hook a browser kernel of the Web sandbox, wherein the hook program is used to intercept the page code of the first display page group; and
wherein injecting, by the threat detection apparatus, preset dynamic code into the page code of the first display page group comprises:
injecting, by the threat detection apparatus, the preset dynamic code into the page code of the first display page group when the hook program obtains the page code of the first display page group.

7. The threat detection method according to claim 1, wherein the dynamic code is placed at an end of the page code of the first display page group.

8. The threat detection method according to claim 2, wherein the dynamic code is placed at an end of the page code of the first display page group.

9. The threat detection method according to claim 3, wherein the dynamic code is placed at an end of the page code of the first display page group.

10. The threat detection method according to claim 5, wherein the dynamic code is placed at an end of the page code of the first display page group.

11. A threat detection apparatus, comprising:
one or more processors coupled to a memory storing instructions which, when executed by the one or more processors, cause the apparatus to:
obtain, from a Web server, page code of a first display page group identified by a uniform resource locator (URL) when loading the URL in a browser of a Web sandbox;
inject preset dynamic code into the page code of the first display page group to trigger switching from a current display page to a next display page of the current display page,
parse and execute the page code that is of the first display page group and that comprises the preset dynamic code; and
display, in a sequential manner, display pages in the first display page group in a display area of the browser based on an execution of the preset dynamic code that is injected into the page code of the first display page group, wherein the preset dynamic code is executed to implement automatically scrolling from the current display page to a next display page of the current display page in the first display page group; and
an interface circuit configured to:
send a request message to the Web server when the apparatus detects display pages that have been displayed in the display area of the browser is greater than or equal to a preset value, wherein the request message is used to request to obtain page code of a second display page group from the Web server, wherein a first display page in the second display page group is a next display page of a last display page in the first display page group, and wherein the preset value is greater than or equal to one display page in the first display page group and less than the overall display pages in the first display page group, and receive a response message sent by the Web server, wherein the response message comprises the page code of the second display page group; and
wherein the instructions, when executed by the one or more processors, further cause the apparatus to:
detect, in the Web sandbox, whether the page code that is of the second display page group that is received by the interface circuit carries attack code.

12. The threat detection apparatus according to claim 11, wherein the instructions, when executed, cause the apparatus to:
receive, by using a Socket interface, the page code that is of the first display page group identified by the URL and that is sent by the Web server.

13. The threat detection apparatus according to claim 11, wherein the instructions, when executed, cause the apparatus to:
set a hook program to hook a network layer protocol processing function of the Web sandbox, wherein the hook program is used to intercept the page code of the first display page group; and
inject the preset dynamic code into the page code of the first display page group when the hook program obtains the page code of the first display page group.

14. The threat detection apparatus according to claim 12, wherein the instructions, when executed, cause the apparatus to:
set a hook program to hook a network layer protocol processing function of the Web sandbox, wherein the hook program is used to intercept the page code of the first display page group; and
inject the preset dynamic code into the page code of the first display page group when the hook program obtains the page code of the first display page group.

15. The threat detection apparatus according to claim 11, wherein the instructions, when executed, cause the apparatus to:
set a hook program to hook a browser kernel of the Web sandbox, wherein the hook program is used to intercept the page code of the first display page group; and
inject the preset dynamic code into the page code of the first display page group when the hook program obtains the page code of the first display page group.

16. The threat detection apparatus according to claim 12, wherein the instructions, when executed, cause the apparatus to:
set a hook program to hook a browser kernel of the Web sandbox, wherein the hook program is used to intercept the page code of the first display page group; and
inject the preset dynamic code into the page code of the first display page group when the hook program obtains the page code of the first display page group.

17. The threat detection apparatus according to claim 11, wherein
the preset dynamic code is placed at an end of the page code of the first display page group.

18. The threat detection apparatus according to claim 13, wherein
the preset dynamic code is placed at an end of the page code of the first display page group.

19. The threat detection apparatus according to claim 15, wherein
the preset dynamic code is placed at an end of the page code of the first display page group.

20. A network system, comprising:
a Web server; and a threat detection apparatus coupled to the Web server via a network and configured to:

obtain, from the Web server, page code of a first display page group identified by a uniform resource locator (URL) when loading the URL in a browser of a Web sandbox;

inject preset dynamic code into the page code of the first display page group to trigger switching from a current display page to a next display page of the current display page;

parse and execute the page code that is of the first display page group and that comprises the preset dynamic code;

display, in a sequential manner, display pages in the first display page group in a display area of the browser based on an execution of the preset dynamic code that is injected into the page code of the first display page group, wherein the preset dynamic code is executed to implement automatically scrolling from the current display page to a next display page of the current display page in the first display page group;

send a request message to the Web server when the apparatus detects display pages that have been displayed in the display area of the browser is greater than or equal to a preset value, wherein the request message is used to request to obtain page code of a second display page group from the Web server, wherein a first display page in the second display page group is a next display page of a last display page in the first display page group, and wherein the preset value is greater than or equal to one display page in the first display page group and less than the overall display page in the first display page group;

receive a response message sent by the Web server, wherein the response message comprises the page code of the second display page group; and detect, in the Web sandbox, whether the page code of the second display page group carries attack code.

* * * * *